(12) United States Patent
Chang et al.

(10) Patent No.: US 6,728,586 B2
(45) Date of Patent: Apr. 27, 2004

(54) MICROELECTRONIC FABRICATION PRODUCTION CONTROL METHOD AND SYSTEM PROVIDING ENHANCED MICROELECTRONIC FABRICATION FACILITY UTILIZATION FLEXIBILITY

(75) Inventors: Chao-Hsin Chang, Hsin-Chu (TW); Cheng-Hsi Wen, Hsin-Chu (TW); Edwin Liou, Hsin-Chu (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 70 days.

(21) Appl. No.: 10/047,329

(22) Filed: Jan. 14, 2002

(65) Prior Publication Data

US 2003/0135297 A1 Jul. 17, 2003

(51) Int. Cl.[7] ................................ G06F 19/00
(52) U.S. Cl. .................. 700/99; 700/100; 700/121; 705/8
(58) Field of Search .................. 700/121, 99–101, 700/97; 705/7–9

(56) References Cited

U.S. PATENT DOCUMENTS

| | | | | |
|---|---|---|---|---|
| 4,459,663 A | * | 7/1984 | Dye | 705/29 |
| 4,567,359 A | * | 1/1986 | Lockwood | 235/381 |
| 5,612,886 A | | 3/1997 | Weng | |
| 5,818,715 A | * | 10/1998 | Marshall et al. | 705/8 |
| 5,818,716 A | | 10/1998 | Chin et al. | |
| 6,415,195 B1 | * | 7/2002 | Gleditsch et al. | 700/99 |
| 6,591,153 B2 | * | 7/2003 | Crampton et al. | 700/103 |
| 2001/0032111 A1 | * | 10/2001 | Jensen et al. | 705/8 |
| 2001/0044667 A1 | * | 11/2001 | Nakano et al. | 700/100 |
| 2002/0004686 A1 | * | 1/2002 | Chiba | 700/97 |

* cited by examiner

*Primary Examiner*—Leo Picard
*Assistant Examiner*—Alexander Kosowski
(74) *Attorney, Agent, or Firm*—Tung & Associates

(57) ABSTRACT

Within both a method for controlling microelectronic fabrication production and a system for controlling microelectronic fabrication production there is developed and evaluated for a plurality of microelectronic fabrication facilities a plurality of demand, allocation and output management plans prior to assigning and entering within at least one microelectronic fabrication facility a microelectronic fabrication order. The development and evaluation of the plurality of demand, allocation and output management plans provides for enhanced flexibility when assigning and entering the microelectronic fabrication order.

6 Claims, 2 Drawing Sheets

MICROELECTRONIC FABRICATION PRODUCTION CONTROL METHOD AND SYSTEM PROVIDING ENHANCED MICROELECTRONIC FABRICATION FACILITY UTILIZATION FLEXIBILITY

BACKGROUND OF THE INVENTION

1. Field of the Invention

The present invention relates generally to methods and systems for fabricating microelectronic fabrications. More particularly, the present invention relates to production control methods and systems for fabricating microelectronic fabrications.

2. Description of the Related Art

Microelectronic fabrications are formed from microelectronic substrates over which are formed patterned microelectronic conductor layers which are separated by microelectronic dielectric layers.

Integral to the fabrication of microelectronic fabrications within microelectronic fabrication facilities is the implementation and use of production control methods and production control systems for controlling microelectronic fabrication production within microelectronic fabrication facilities. Production control methods and production control systems are desirable in the art of microelectronic fabrication for controlling microelectronic fabrication production within microelectronic fabrication facilities insofar as microelectronic fabrication products are typically fabricated employing sufficiently large numbers of fabrication processes such that they may not generally be efficiently fabricated absent production control methods and production control systems.

While production control methods and production control systems are thus desirable in the art of microelectronic fabrication and generally essential in the art of microelectronic fabrication, production control methods and production control systems are nonetheless not entirely without problems in the art of microelectronic fabrication. In that regard, it is often difficult in the art of microelectronic fabrication to provide production control methods and production control systems which in turn provide for enhanced flexibility when fabricating microelectronic fabrications within microelectronic fabrication facilities.

It is thus desirable in the art of microelectronic fabrication to provide production control methods and production control systems which provide for enhanced flexibility when fabricating microelectronic fabrications within microelectronic fabrication facilities.

It is towards the foregoing object that the present invention is directed.

Various production control methods and production control systems having desirable properties have been disclosed in the art of microelectronic fabrication.

Included among the production control methods and production control systems, but not limiting within the production control methods and systems, are production control methods and production control systems disclosed within: (1) Weng, in U.S. Pat. No. 5,612,886 (a production control method and a production control system which provide enhanced microelectronic fabrication facility efficiency by employing within the production control method and the production control system a dynamic dispatching algorithm which has incorporated therein a microelectronic substrate release algorithm); and (2) Chin et al., in U.S. Pat. No. 5,818,716 (a production control method and a production control system which provide a reduced cycle time within a microelectronic fabrication facility by employing within the production control method and the production control system a dynamic dispatching algorithm which is predicated upon a required turn rate within the microelectronic fabrication facility).

Desirable in the art of microelectronic fabrication are additional production control methods and production control systems which provide for enhanced flexibility when fabricating microelectronic fabrication products within microelectronic fabrication facilities.

It is towards the foregoing object that the present invention is directed.

SUMMARY OF THE INVENTION

A first object of the present invention is to provide a production control method and a production control system for fabricating a microelectronic fabrication product within a microelectronic fabrication facility.

A second object of the present invention is to provide a production control method and a production control system in accord with the first object of the present invention, wherein there is provided enhanced flexibility when fabricating the microelectronic fabrication product within the microelectronic fabrication facility.

A third object of the present invention is to provide a production control method and a production control system in accord with the first object of the present invention and the second object of the present invention, wherein the production control method and the production control system are readily commercially implemented.

In accord with the objects of the present invention, there is provided by the present invention a production control method for fabricating a microelectronic fabrication product within a microelectronic fabrication facility and a production control system for fabricating the microelectronic fabrication product within the microelectronic fabrication facility.

To practice the production control method of the present invention, there is first provided a plurality of microelectronic fabrication facilities. There is then received from a customer a microelectronic fabrication order for fabricating a microelectronic fabrication product which may be fabricated within each of the plurality of microelectronic fabrication facilities. There is then developed for each of plurality of microelectronic fabrication facilities a demand, allocation and output management plan for fulfilling the microelectronic fabrication order. There is then evaluated the plurality of demand, allocation and output management plans developed for the plurality of microelectronic fabrication facilities. Finally, there is then assigned and entered the microelectronic fabrication order within at least one microelectronic fabrication facility within the plurality of microelectronic fabrication facilities having a favorably evaluated demand, allocation and output management plan.

In particular within the production control method of the present invention, the microelectronic fabrication order for fabricating the microelectronic fabrication product is not assigned and entered prior to evaluating for each of the plurality of microelectronic fabrication facilities the plurality of demand, allocation and output management plans for fulfilling the microelectronic fabrication order within each of the plurality of microelectronic fabrication facilities.

The production control method of the present invention contemplates a production control system in accord with the production control method of the present invention.

The present invention provides a production control method for fabricating a microelectronic fabrication product within a microelectronic fabrication facility and a production control system for fabricating the microelectronic fabrication product within the microelectronic fabrication facility, wherein there is provided enhanced flexibility when fabricating the microelectronic fabrication product within the microelectronic fabrication facility.

The present invention realizes the foregoing object within the context of a plurality of microelectronic fabrication facilities within which may be fabricated a microelectronic fabrication product to fulfill a microelectronic fabrication order by evaluating for each of the plurality of microelectronic fabrication facilities a demand, allocation and output management plan for fabricating the microelectronic fabrication product to fulfill the microelectronic fabrication order prior to assigning and entering the microelectronic fabrication order within at least one microelectronic fabrication facility having a favorably evaluated demand, allocation and output management plan.

The production control method of the present invention and the production control system of the present invention are readily commercially implemented.

The present invention involves production control requirements and production control systems as are otherwise generally conventional in the art of microelectronic fabrication, but employed within the context of specific methodologic process limitations to provide the production control method of the present invention and the production control system of the present invention.

Since it is thus at least in part specific methodologic process limitations which provide at least in part the present invention, rather than the existence of production control requirements and production control systems which provides the present invention, the production control method of the present invention and the production control system of the present invention are readily commercially implemented.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

The present invention provides a production control method for fabricating a microelectronic fabrication product within a microelectronic fabrication facility and a production control system for fabricating the microelectronic fabrication product within the microelectronic fabrication facility, wherein there is provided enhanced flexibility when fabricating the microelectronic fabrication product within the microelectronic fabrication facility.

The present invention realizes the foregoing object within the context of a plurality of microelectronic fabrication facilities within which may be fabricated a microelectronic fabrication product to fulfill a microelectronic fabrication order by evaluating for each of the plurality of microelectronic fabrication facilities a demand, allocation and output management plan for fabricating the microelectronic fabrication product to fulfill the microelectronic fabrication order prior to assigning and entering the microelectronic fabrication order within at least one microelectronic fabrication facility having a favorably evaluated demand, allocation and output management plan.

While the present invention provides particular value for flexibly controlling production of semiconductor integrated circuit microelectronic fabrication products within semiconductor integrated circuit microelectronic fabrication facilities, the present invention is not intended to be so limited. Rather the present invention may be employed for flexibly controlling production of microelectronic fabrication products including but not limited to integrated circuit microelectronic fabrication products, ceramic substrate microelectronic fabrication products, solar cell optoelectronic microelectronic fabrication products, sensor image array optoelectronic microelectronic fabrication products and display image array optoelectronic microelectronic fabrication products.

Figure 1:
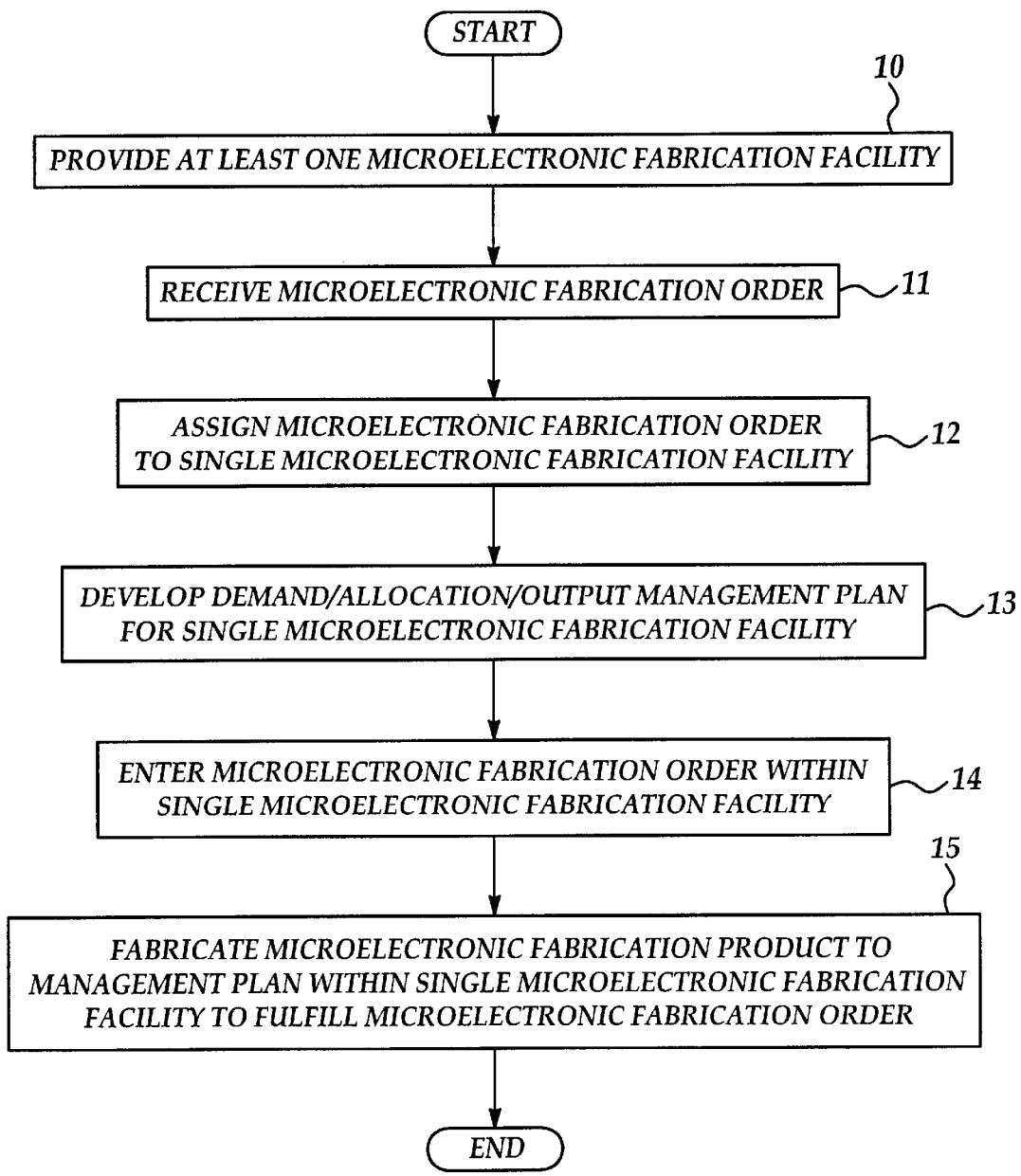
FIG. 1 shows a schematic block diagram illustrating a production control method not in accord with the present invention.

Referring now to FIG. 1, and in order to provide a better understanding of the nature of the present invention, there is shown a schematic block diagram illustrating a production control method not in accord with the present invention.

Shown in FIG. 1, and in accord with the block which corresponds with reference numeral 10, there is first provided at least one microelectronic fabrication facility.

In accord with the above, the microelectronic fabrication facility may be employed for fabricating microelectronic fabrications selected from the group including but not limited to integrated circuit microelectronic fabrications, ceramic substrate microelectronic fabrications, solar cell optoelectronic microelectronic fabrications, sensor image array optoelectronic microelectronic fabrications and display image array optoelectronic microelectronic fabrications.

Referring again to FIG. 1, and in accord with the block which corresponds with reference numeral 11, there is received a microelectronic fabrication order for fabricating a microelectronic fabrication product which may be fabricated within each of the at least one microelectronic fabrication facilities. Within the present invention, in general, the nature of the microelectronic fabrication for which an order is received is determined within the context of the nature of the at least one microelectronic fabrication facility. Similarly, receipt of the microelectronic fabrication order may require engineering discussions and experimental production under circumstances where the microelectronic fabrication order is for a microelectronic fabrication product not previously produced within the at least one microelectronic fabrication facility.

Referring again to FIG. 1, and in accord with the block which corresponds with reference numeral 12, the microelectronic fabrication order is assigned to a single microelectronic fabrication facility selected from the at least one microelectronic fabrication facility. Typically and preferably, when assigning the microelectronic fabrication order to the single microelectronic fabrication facility under circumstances where there exists more than one microelectronic fabrication facility, consideration is given to historic microelectronic fabrication product type produced from the microelectronic fabrication facilities under consideration for assignment of the microelectronic fabrication order.

Referring again to FIG. 1, and in accord with the block which corresponds with reference numeral 13, there is then developed for the single microelectronic fabrication facility to which has been assigned the microelectronic fabrication order a demand/allocation/output management plan for fulfilling the microelectronic fabrication order within the single microelectronic fabrication facility.

Within the present invention, the demand/allocation/output management plan is intended as directed towards: (1) addressing microelectronic fabrication product demand in accord with the microelectronic fabrication product order; (2) allocating microelectronic fabrication production resources within the single microelectronic fabrication facility to fulfill the microelectronic fabrication product demand and the microelectronic fabrication order; and (3) providing a time based output of microelectronic fabrication product which will timely fulfill the microelectronic fabrication order.

Referring again to FIG. 1, and in accord with the block which corresponds with reference numeral 14, there is then entered the microelectronic fabrication order within the single microelectronic fabrication facility.

By entering the microelectronic fabrication order within the single microelectronic fabrication facility, it is intended that there is provided a commitment to produce the microelectronic fabrication product within the context of the microelectronic fabrication order and the demand/allocation/output management plan within the single microelectronic fabrication facility.

Finally, referring again to FIG. 1, and in accord with the block which corresponds with reference numeral 15, a quantity of microelectronic fabrication product is fabricated within the single microelectronic fabrication facility in order to fulfill the microelectronic fabrication order.

As is understood by a person skilled in the art, while the production control method as provided within the schematic block diagram of FIG. 1 provides a production control method for fabricating a microelectronic fabrication, certain portions of which method may be generally conventional in the art of microelectronic fabrication, the production control method as provided within the schematic block diagram of FIG. 1 does not provide much flexibility with respect to fulfilling the microelectronic fabrication order incident to fabricating the quantity of microelectronic fabrication product within the single microelectronic fabrication facility.

Figure 2:
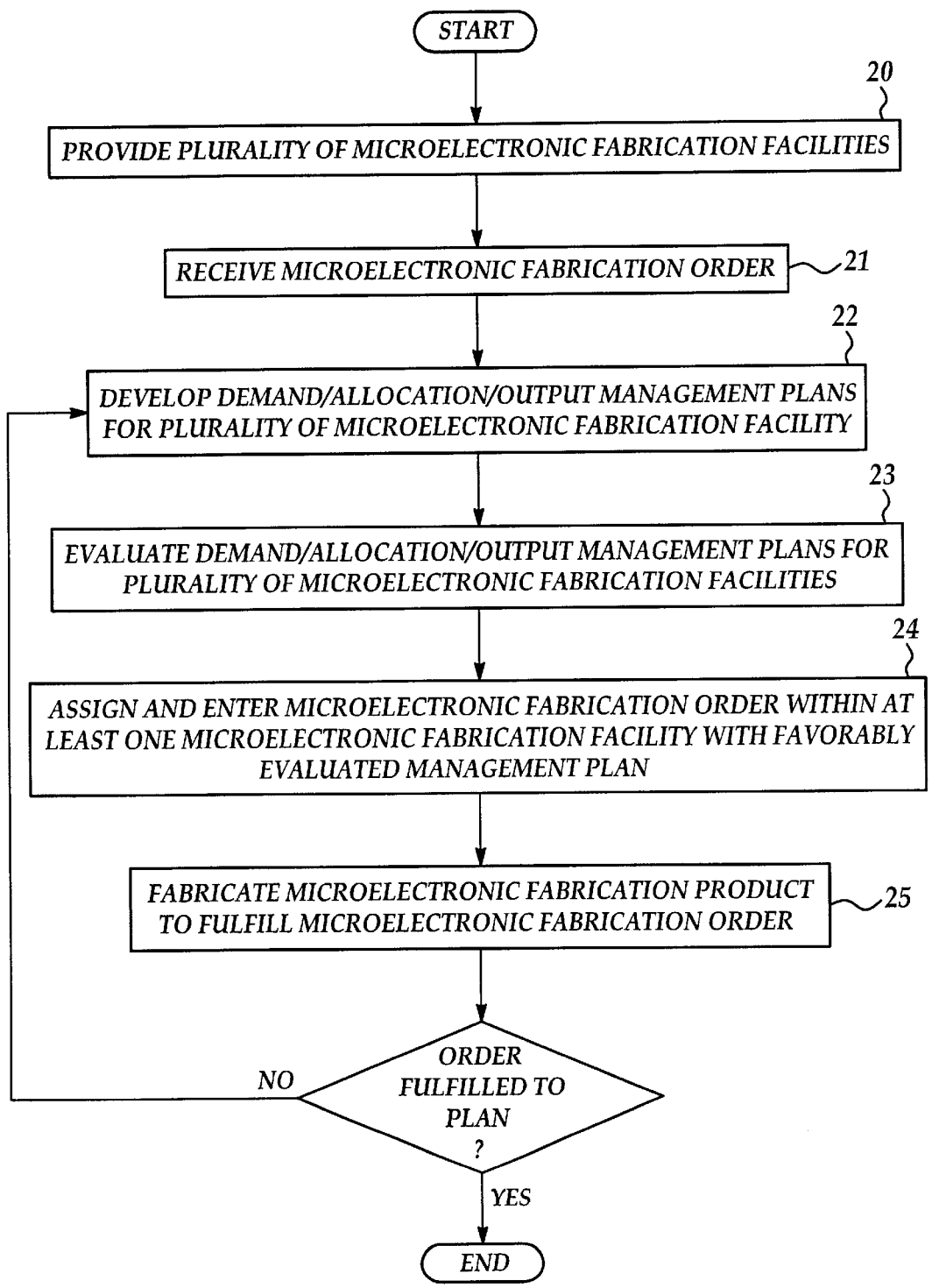
FIG. 2 shows a schematic block diagram illustrating a production control method in accord with a preferred embodiment of the present invention.

Thus, in order to provide enhanced flexibility with respect to fulfilling microelectronic fabrication orders when fabricating microelectronic fabrication products within microelectronic fabrication facilities, there is provided a production control method in accord with the present invention, as is illustrated within the schematic block diagram of FIG. 2.

Referring now to FIG. 2, and in accord with the block which corresponds with reference numeral 20, there is first provided a plurality of microelectronic fabrication facilities.

Within the present invention, within the plurality of microelectronic fabrication facilities there may typically be fabricated a plurality of microelectronic fabrications, although such is not a requirement of the present invention.

Similarly, within the preferred embodiment of the present invention, the plurality of microelectronic fabrication facilities is analogous, equivalent or identical to the at least one microelectronic fabrication facility as provided within the block which corresponds with reference numeral 10 within FIG. 1, presuming that the at least one microelectronic fabrication facility comprises greater than one microelectronic fabrication facility. Similarly, and in accord with disclosure above, within the preferred embodiment of the present invention the plurality of microelectronic fabrication facilities is typically and preferably a plurality of semiconductor integrated circuit microelectronic fabrication facilities.

Referring again to FIG. 2, and in accord with the block which corresponds with reference numeral 21, there is next received a microelectronic fabrication order which may be fulfilled incident to production of a microelectronic fabrication product within any of the plurality of microelectronic fabrication facilities in accord with the block which corresponds with reference numeral 20.

Within the preferred embodiment of the present invention, the microelectronic fabrication order is otherwise analogous, equivalent or identical to the microelectronic fabrication order as provided in conjunction with the block which corresponds with reference numeral 11 within FIG. 1.

Referring again to FIG. 2, and in accord with the block which corresponds with reference numeral 22, there is then developed a demand/allocation/output management plan for fulfillment of the microelectronic fabrication order within each of the microelectronic fabrication facilities in accord with the block which corresponds with reference numeral 20.

While the methodologic process step which corresponds with reference numeral 22 within the preferred embodiment of the production control method of the present invention as illustrated within the schematic block diagram of FIG. 2 is otherwise analogous, equivalent or identical to the methodologic process step which corresponds with reference numeral 13 within the production control method not in accord with the present invention as illustrated within the schematic block diagram of FIG. 1, it is noted within the present invention that a microelectronic fabrication order is not assigned to any particular microelectronic fabrication facility prior to first developing a demand/allocation/output management plan for each microelectronic fabrication facility within the plurality of microelectronic fabrication facilities within which there may be fabricated a microelectronic fabrication product to fulfill the microelectronic fabrication order.

Referring again to FIG. 2, and in accord with the block which corresponds with reference numeral 23, there is then evaluated the demand/allocation/output management plans for the plurality of microelectronic fabrication facilities.

Typically and preferably, such an analysis will entail discerning which microelectronic fabrication facilities may most reasonably accommodate the microelectronic fabrication order within the context of the microelectronic fabrication order demands. In turn, demands are generally directed to production costs and delivery schedules.

Referring again to FIG. 2, and in accord with the block which corresponds with reference numeral 24, the microelectronic fabrication order is assigned and entered for production within at least one microelectronic fabrication facility which has a favorable evaluation of its demand/allocation/management plan.

Finally, and referring again to FIG. 2, and in accord with the block which corresponds with reference numeral 25, there is fabricated a quantity of microelectronic fabrication product within the assigned microelectronic fabrication facility or facilities such as to fulfill the microelectronic fabrication order.

Referring finally again to FIG. 2, and in accord with the block which corresponds with reference numeral 26, incident to fabrication of the microelectronic fabrication product within the assigned microelectronic fabrication facility or facilities to fulfill the microelectronic fabrication order an optional inquiry may be made as to whether the microelectronic fabrication order is being fulfilled to plan (i.e., typically directed towards whether production and delivery demands will be timely met).

If the microelectronic fabrication order is being fulfilled to plan, no further action is taken directed towards fulfillment of the microelectronic fabrication order. In the alternative, if microelectronic fabrication order fulfillment is not progressing to plan, the preferred embodiment of the present invention provides for redevelopment, reevaluation of demand/allocation/output management plans for the plurality of microelectronic fabrication facilities, in accord with the block which corresponds with reference numeral 22, such that a recovery in fulfilling the microelectronic fabrication order may be effected.

As is understood by a person skilled in the art, while the schematic diagram of FIG. 2 illustrates the present invention within the context of a series of methodologic process steps to provide a preferred embodiment of a method of the present invention, the present invention also contemplates a system, and in particular a computer implemented system, which may assist in practice of the method of the present invention.

A computer assisted system in accord with the present invention will typically and preferably employ a digital computer as is otherwise generally conventional in the art of microelectronic fabrication, but programmed such as to effect the method of the present invention with respect to at least development and evaluation of demand/allocation/output management plans. Similarly, the digital computer will employ data storage components and user interface components as are also conventional in the art of microelectronic fabrication.

As is further understood by a person skilled in the art, for efficient operation of the method of the present invention, it may be desirable to implement a microelectronic fabrication facility transparent naming and designation of microelectronic fabrication work in process (WIP) workload so that a quantity of microelectronic fabrication product produced to fulfill a microelectronic fabrication order is not generally associated with a particular microelectronic fabrication facility.

As is further understood by a person skilled in the art, the preferred embodiment of the present invention is illustrative of the present invention rather than limiting of the present invention. Revisions and modifications may be made to methods and systems in accord with the preferred embodiment of the present invention while still providing a method in accord with the present invention and a system in accord with the present invention, further in accord with the accompanying claims.

What is claimed is:

1. A method for controlling microelectronic fabrication production comprising:
providing a plurality of microelectronic fabrication facilities and a computer system, the computer system programmed for:
receiving from a customer a microelectronic fabrication order for fabricating a microelectronic fabrication product which may be fabricated within each of the plurality of microelectronic fabrication facilities;
developing for each of the plurality of microelectronic fabrication facilities a demand, allocation and output management plan for fulfilling the microelectronic fabrication order;
evaluating the plurality of demand, allocation and output management plans developed for the plurality of microelectronic fabrication facilities;
assigning and entering the microelectronic fabrication order within at least one assigned microelectronic fabrication facility within the plurality of microelectronic fabrication facilities having a favorably evaluated demand, allocation and output management plan, such as to provide for fabricating a quantity of microelectronic fabrication product within the at least one assigned microelectronic fabrication facility to fulfill the microelectronic fabrication order;
inquiring when fabricating the quantity of microelectronic fabrication product within the at least one assigned microelectronic fabrication facility to fulfill the microelectronic fabrication order whether the microelectronic fabrication order is being fulfilled in accord with the favorable demand, allocation and output management plan; and
redeveloping and reevaluating the plurality of demand, allocation and output management plans for the plurality of microelectronic fabrication facilities if the microelectronic fabrication order is not being fulfilled in accord with the favorable demand, allocation and output management plan.

2. The method of claim 1 wherein the microelectronic fabrication order is not assigned and entered prior to evaluating for each of the plurality of microelectronic fabrication facilities the plurality of demand, allocation and output management plans.

3. The method of claim 1 wherein the microelectronic fabrication facilities are selected from the group consisting of integrated circuit microelectronic fabrication facilities, ceramic substrate microelectronic fabrication facilities, solar cell optoelectronic microelectronic fabrication facilities, sensor image array optoelectronic microelectronic fabrication facilities and display image array optoelectronic microelectronic fabrication facilities.

4. A system for controlling microelectronic fabrication production comprising:
a plurality of microelectronic fabrication facilities and a computer, the computer comprising;
means for receiving from a customer a microelectronic fabrication order for fabricating a microelectronic fabrication product which may be fabricated within each of the plurality of microelectronic fabrication facilities;
means for developing for each of plurality of microelectronic fabrication facilities a demand, allocation and output management plan for fulfilling the microelectronic fabrication order;
means for evaluating the plurality of demand, allocation and output management plans developed for the plurality of microelectronic fabrication facilities;
means for assigning and entering the microelectronic fabrication order within at least one assigned microelectronic fabrication facility within the plurality of microelectronic fabrication facilities having a favorably evaluated demand, allocation and output management plan, such as to provide for fabricating a quantity of microelectronic fabrication product within the at least one assigned microelectronic fabrication facility to fulfill the microelectronic fabrication order;
means for inquiring when fabricating the quantity of microelectronic fabrication product within the at least one assigned microelectronic fabrication facility to fulfill the microelectronic fabrication order whether the microelectronic fabrication order is being fulfilled in accord with the favorable demand, allocation and output management plan; and means for redeveloping and reevaluating a plurality of demand, allocation and output management plans for the plurality of microelectronic fabrication facilities if the microelectronic fabrication order is not being fulfilled in accord with the favorable demand, allocation and output management plan.

5. The system of claim 4 wherein the microelectronic fabrication order is not assigned and entered prior to evaluating for each of the plurality of microelectronic fabrication facilities the plurality of demand, allocation and output management plans.

6. The system of claim 4 wherein the microelectronic fabrication facilities are selected from the group consisting of integrated circuit microelectronic fabrication facilities, ceramic substrate microelectronic fabrication facilities, solar cell optoelectronic microelectronic fabrication facilities, sensor image array optoelectronic microelectronic fabrication facilities and display image array optoelectronic microelectronic fabrication facilities.

* * * * *